(12) United States Patent
Kim et al.

(10) Patent No.: US 9,639,749 B2
(45) Date of Patent: May 2, 2017

(54) APPARATUS AND METHOD FOR DISPLAYING USER INPUT APPLYING TEXTURE OF BACKGROUND IMAGE

(71) Applicant: Samsung Electronics Co., Ltd., Suwon-si, Gyeonggi-do (KR)

(72) Inventors: Do-Hyeon Kim, Suwon-si (KR); Ho-Young Jung, Suwon-si (KR); Dong-Hyuk Lee, Seoul (KR); Won-Suk Chang, Hwaseong-si (KR); Seong-Taek Hwang, Pyeongtaeki-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 14/188,121

(22) Filed: Feb. 24, 2014

(65) Prior Publication Data

US 2014/0240258 A1 Aug. 28, 2014

(30) Foreign Application Priority Data

Feb. 22, 2013 (KR) ........................ 10-2013-0019400

(51) Int. Cl.
*G06F 3/041* (2006.01)
*G06K 9/00* (2006.01)
*G06K 9/46* (2006.01)

(52) U.S. Cl.
CPC ....... *G06K 9/00409* (2013.01); *G06K 9/4609* (2013.01); *G06K 2209/01* (2013.01)

(58) Field of Classification Search
CPC .......... G06K 9/00409; G06K 2209/01; G06K 9/4609
See application file for complete search history.

(56) References Cited

U.S. PATENT DOCUMENTS

| | | | | |
|---|---|---|---|---|
| 2010/0231539 | A1* | 9/2010 | Cruz-Hernandez ... | G06F 3/0488 345/173 |
| 2011/0249007 | A1* | 10/2011 | Kuster .................. | G06T 11/001 345/441 |
| 2012/0268412 | A1 | 10/2012 | Cruz-Hernandez et al. | |
| 2013/0229391 | A1* | 9/2013 | DiVerdi ................ | G06F 3/0488 345/179 |

* cited by examiner

*Primary Examiner* — Matthew Sim
(74) *Attorney, Agent, or Firm* — Jefferson IP Law, LLP

(57) ABSTRACT

A method of processing an image is provided. The method includes identifying edge components of a background image by a unit of a predetermined size, identifying input coordinate points of a touch input which is input on a touch screen, determining distorted coordinate points by applying the edge components to the input coordinate points, and displaying a drawing image formed by connecting the distorted coordinate points, on the background image.

9 Claims, 21 Drawing Sheets

APPARATUS AND METHOD FOR DISPLAYING USER INPUT APPLYING TEXTURE OF BACKGROUND IMAGE

CROSS-REFERENCE TO RELATED APPLICATION(S)

This application claims the benefit under 35 U.S.C. §119 (a) of a Korean patent application filed on Feb. 22, 2013 in the Korean Intellectual Property Office and assigned Serial No. 10-2013-0019400, the entire disclosure of which is hereby incorporated by reference.

TECHNICAL FIELD

The present disclosure relates to an apparatus and method for processing an image. More particularly the present disclosure relates to an apparatus and method for displaying data input by a user by applying a quality of a background image to the data.

BACKGROUND

Recently, various services and additional functions provided by a mobile apparatus have been gradually expanded. In order to enhance the effective value of such a mobile apparatus and to satisfy users' desires, various applications capable of being executed in a mobile apparatus have been developed.

In a mobile apparatus, basic applications produced by the manufacturer of the mobile apparatus and installed in the corresponding apparatus, and additional applications bought and downloaded from websites and/or other sources that sell the applications may be stored and executed. The additional applications may be developed by general developers and registered on the websites that sell the applications. Accordingly, anyone may freely sell applications they develop, by themselves, to mobile apparatus users through the websites that sell applications. Accordingly, tens of thousands to hundreds of thousands of free or priced applications are provided to the mobile apparatuses according to types of the mobile apparatuses.

Therefore, the mobile apparatus, such as a smartphone, a Personal Computer (PC), a tablet PC, a mobile terminal, a Personal Media Player (PMP), a digital camera, and any other similar and/or suitable electronic device may store at least several tens to hundreds of applications therein, and shortcut keys are displayed in the form of icons on a touch screen of each mobile apparatuses in order to execute the respective applications. Accordingly, a user may touch any one of the icons displayed on the touch screen, thereby executing a desired application in the mobile apparatus.

On the other hand, as technologies related to touch screens provided in the mobile apparatuses have been improved, sizes of touch screens have been reduced and technologies implementing the touch screens have been variously applied to the mobile apparatuses. In addition to the development of the hardware technologies, various applications utilizing the touch screen have been developed. Particularly, various applications such as note applications, drawing applications and similar and/or suitable applications capable of storing a touch input, a literal input, or any other similar style and/or type of input of a user have been developed, and various efforts have been tried to more actually express the touch input or the literal input of the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address the above-mentioned problems and/or disadvantages and to provide at least the advantages described below. Accordingly, an aspect of the present disclosure is to provide an apparatus and method for more accurately displaying a touch input and/or a literal input of a user considering a quality or a shape of a background image.

Another aspect of the present disclosure is to provide an apparatus and method for correcting a touch input and/or a literal input of a user by applying an edge component of a background image thereto, thereby displaying the touch input and/or the literal input of the user by applying a quality or a shape of the background image.

In accordance with an aspect of the present disclosure, a method of processing an image is provided. The method includes identifying edge components of a background image by a unit of a predetermined size, identifying input coordinate points of a touch input which is input on a touch screen, determining distorted coordinate points by applying the edge components to the input coordinate points, and displaying a drawing image which is formed by connecting the distorted coordinate points, on the background image.

In accordance with another aspect of the present disclosure, a method of processing an image is provided. The method includes identifying edge components of a background image by a unit of a predetermined size, receiving an input of character, identifying display coordinate points at which the input character is displayed, determining distorted coordinate points by applying the edge components to the display coordinate points, and displaying the input character to which the distorted coordinate points are applied, on the background image.

In accordance with still another aspect of the present disclosure, a terminal apparatus is provided. The terminal apparatus includes a display unit, a touch input interface unit, at least one controller, and a memory unit which stores at least an image processing program, wherein the image processing program is executed by the controller, and comprises instructions which are used to identify edge components of a background image by a unit of a predetermined size, to identify input coordinate points of a touch input which is input on the touch input interface unit, to determine distorted coordinate points by applying the edge components to the input coordinate points, and to provide a drawing image formed by connecting the distorted coordinate points on the background image.

In accordance with still another aspect of the present disclosure, a non-transitory computer-readable storage medium for storing at least one program is provided, wherein the at least one program comprises instructions which are used to identify edge components of a background image by a unit of a predetermined size, to identify input coordinate points of a touch input which is input on the touch input interface unit, to determine distorted coordinate points by applying the edge components to the input coordinate points, and to provide a drawing image formed by connecting the distorted coordinate points on the background image.

In accordance with another aspect of the present disclosure, a terminal apparatus is provided. The terminal apparatus includes a display unit, an input interface unit, at least one controller, and a memory unit which stores at least an image processing program, wherein the image processing program comprises instructions which are used to identify edge components of a background image by a unit of a predetermined size, to receive a character through the input interface unit, to identify display coordinate points of the input character, to determine distorted coordinate points by applying the edge components to the display coordinate points, and to provide the input character to which the distorted coordinate points are applied, on the background image.

In accordance with another aspect of the present disclosure, a non-transitory computer-readable storage medium for storing at least one program is provided, wherein the at least one program comprises instructions which are used to identify edge components of a background image by a unit of a predetermined size, to receive a character through an input interface, to identify display coordinate points at which the input character is displayed, to determine distorted coordinate points by applying the edge components to the display coordinate points, and to provide the input character to which the distorted coordinate points are applied, the background image.

According to the present disclosure, considering the quality or the shape of the background image, it is possible to more accurately display the touch input and/or the literal input of the user.

Further, since the touch input and/or the literal input of the user is corrected by applying the edge component of the background image thereto, and separate data are not used to apply the quality or shape of the background image to the touch input and/or the literal input of the user, it is possible to display the touch input and/or the literal input of the user by applying the quality or shape of the background image.

Furthermore, since the touch input and/or literal input of the user is corrected by applying the edge component of the background image, it is possible to display the touch input and/or literal input of the user by applying the quality or shape of the background image even though any image is used as the background image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. The terms used in this application is for the purpose of describing particular embodiments only and is not intended to be limiting of the disclosure. As used herein, the singular forms are intended to include the plural forms as well, unless the context clearly indicates otherwise.

Figure 1:
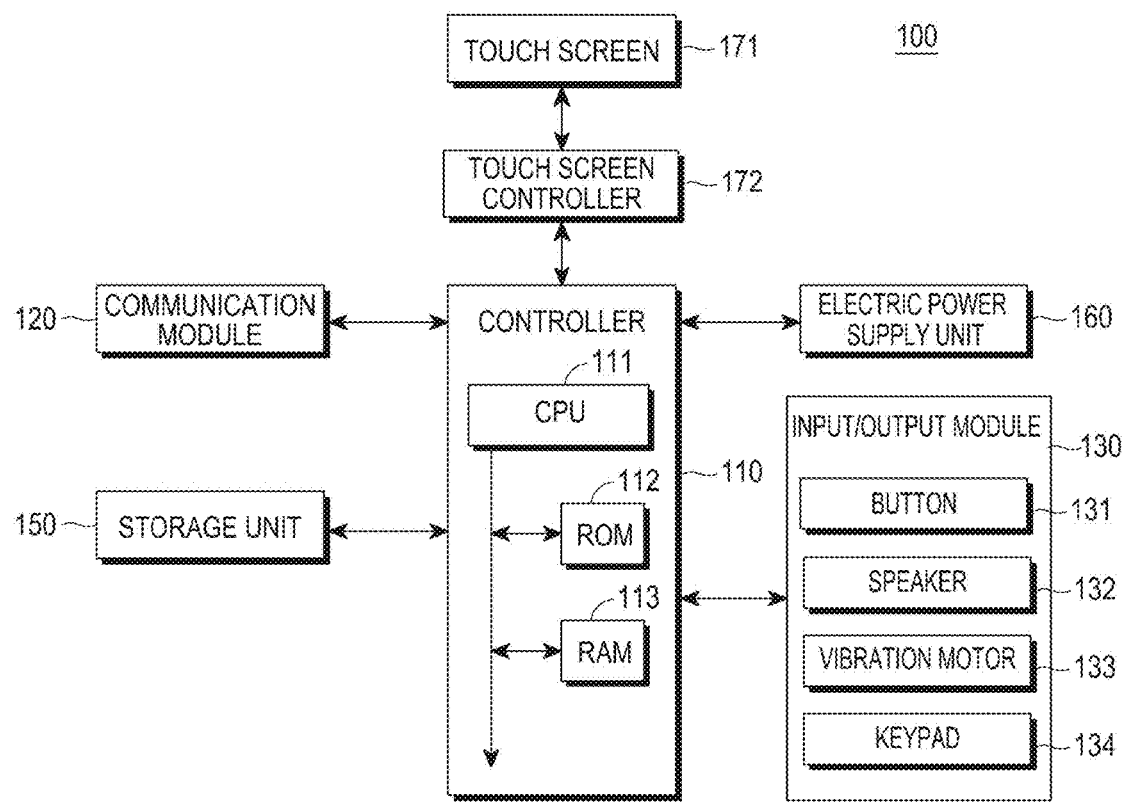
FIG. 1 is a block diagram illustrating a mobile apparatus according to an embodiment of the present disclosure.

FIG. 1 is a block diagram illustrating a mobile apparatus according to an embodiment of the present disclosure.

Referring to FIG. 1, a mobile apparatus 100, which may also be referred to as a mobile terminal 100, includes a controller 110, a communication module 120, an input/output module 130, a storage unit 150, an electric power supply unit 160, a touch screen 171, and a touch screen controller 172.

Firstly, the controller unit 110 may include a Central Processing Unit (CPU) 111, a Read Only Memory (ROM) 112 in which a control program for a control of the mobile apparatus 100 is stored, and a Random Access Memory (RAM) 113 which stores a signal or data input from the outside of the mobile apparatus 100, which is used as a memory region for a process executed in the mobile apparatus 100, and which may any other similar and/or suitable type of information. The CPU 111, the ROM 112, and the RAM 113 may be connected to one another through an internal bus (not shown). In addition, the controller 110 is capable of controlling the communication module 120, the input/output module 130, the storage unit 150, the electric power supply unit 160, the touch screen 171, and the touch screen controller 172. Further, the controller 110 may be configured to be a single-core or a multiple core such as a dual-core, a triple-core, and a quad-core processor, or any other similar and/or suitable type of hardware element that performs computational processing. Of course, the number of the cores may be variously determined by a person having an ordinary skill in the art according to a characteristic of a mobile apparatus.

The communication module 120 may include at least one of a cellular module (not shown), a wireless Local Area Network (LAN) module (not shown), a short-range communication module (not shown), or any other similar and/or suitable module and/or hardware element that performs wireless and/or wired communication.

The cellular module allows the mobile apparatus 100 to be connected to an external apparatus through mobile communication using one or more antennas (not shown) under a control of the controller 110. The cellular module transmits and receives a radio signal for a voice call, a video call, a Short Message Service (SMS), a Multimedia Message Service (MMS), data communications, or any other similar and/or suitable type of cellular communications, to/from a portable phone (not shown), a smart phone (not shown), a tablet PC or any other apparatus (not shown) that may communicate with and/or that has a telephone number input into the mobile apparatus 100.

The wireless LAN module may be connected to the Internet at a place where a wireless Access Point (AP) (not shown), or any other similar and/or suitable device providing wireless LAN access to the Internet, is installed, under a control of the controller 110. The wireless LAN module supports the wireless LAN provision of the Institute of American Electrical and Electronics Engineers (IEEE), such as wireless LAN standards of the 802.11x family. The wireless LAN module may operate a Wi-Fi Positioning System (WPS) that identifies position information of a terminal which is provided with the wireless LAN module by using position information provided by a wireless AP wirelessly connected to the wireless LAN module.

The short-range communication module is a module which allows the mobile apparatus 100 to perform short-range communication wirelessly with another mobile apparatus under a control of the controller 110, and may process communication based on a short-range communication scheme, such as Bluetooth communication, Infrared Data Association (IrDA) communication, Wi-Fi-Direct communication, Near Field Communication (NFC), and any other similar and/or suitable type of short-range communication.

The input/output module 130 may include at least one of a button 131, a speaker 132, a vibration motor 133, and a keypad 134.

The button 131 may be disposed on a front surface, a side surface or a rear surface of a housing of the mobile apparatus 100, and may include at least one of an electric power supply/lock button (not shown), a volume button (not shown), a menu button, a home button, a back button, a search button, and any other similar and/or suitable type of button.

The speaker 132 may output sound to an outside of the mobile apparatus 100 corresponding to various signals, e.g., radio signals and broadcasting signals, of the cellular module, the wireless LAN module, and the short-range communication module under a control of the controller 110. One or more speakers 132 may be arranged at a proper position or positions of a housing of the mobile apparatus 100.

The vibration motor 133 is capable of converting electric signals to mechanical vibrations under a control of the controller 110. One or more vibration motors may be arranged in the housing of the mobile apparatus 100.

The speaker 132 and the vibration motor 133 may be operated according to a set condition of a volume operation mode of the mobile apparatus 100. For example, the volume operation mode of the mobile apparatus 100 may be operated in a sound mode, a vibration mode, a sound and vibration mode, and a silent mode, and may be set to any one of these modes. The controller 110 may output a signal that instructs the operation of the speaker 132 and/or the vibration motor 133 according to a function conducted by the mobile apparatus 100, based on the mode to which the volume operation mode is set. For example, the speaker 132 and the vibration motor 133 may output a voice signal or a vibration signal in response to a touch operation of a user which touches the touch screen 171 and a continuous movement of a touch on the touch screen 171.

The storage unit 150 may store signals or data input/output corresponding to the operation of the communication module 120, the input/output module 130, or the touch screen 171 under a control of the control unit 110. The storage unit 150 may store control programs and applications for controlling the mobile apparatus 100 or the controller 110. The storage unit 150 may also store any similar and/or suitable information and/or data that is used and/or generated during the operation of the mobile apparatus 100.

The term, "storage unit" may include the storage unit 150, the ROM 112 and the RAM 113 in the control unit 110, or a memory card (not shown), e.g. a Secure Digital (SD) card or a memory stick, mounted in the mobile apparatus 100. The storage unit may include a non-volatile memory, a volatile memory, a Hard Disc Drive (HDD), a Solid State Drive (SSD), or any other similar and/or suitable type of hardware storage device.

The electric power supply unit 160 may supply electric power to one or more batteries (not shown) disposed in the housing of the mobile apparatus 100 under a control of the controller 110. The one or more batteries supply electric power to the mobile apparatus 100. Further, the electric power supply unit 160 may supply the mobile apparatus 100 with electric power input from an external electric power source (not shown) through a wired cable connected with a connector equipped to the mobile apparatus 100. In addition, the electric power supply unit 160 may supply electric power wirelessly input from the external electric power source to the mobile apparatus 100 through a wireless charging technology.

The touch screen 171 may display User Interfaces (UIs) corresponding to various services, e.g. a voice call and a data transmission, to the user based on an Operating System (OS) of the mobile apparatus 100. The touch screen 171 may transmit an analog signal, corresponding to at least one touch input into the UI, to the touch screen controller 172. The touch screen 171 can receive at least one touch caused by a body of the user, e.g. fingers including a thumb, or a touchable input means such as a stylus pen. Also, the touch screen 171 may receive a continuous movement of one touch. The touch screen 171 may transmit an analog signal corresponding to the continuous movement of the touch input to the touch screen controller 172.

The touch screen 171 may be implemented as, for example, a resistive type, a capacitive type, an infrared type, or an acoustic wave type touch screen. The touch screen 171 may include a display unit (not shown) to display graphical information, and the display unit may be an Light Emitting Diode (OLED) display, an Organic LED (OLED) display, a Liquid Crystal Display (LCD), a Thin-Film-Transistor (TFT) display, or any other similar and/or suitable type of display unit and/or display device.

Meanwhile, the touch screen controller 172 controls an output value of the touch screen 171 so that display data provided from the controller 110 may be displayed on the touch screen 171. Furthermore, the touch screen controller 172 may convert analog signals received from the touch screen 171 into digital signals, i.e. X and Y coordinates, and may transmit the digital signals to the controller 110. The controller 110 may control the touch screen 171 by using the digital signals received from the touch screen controller 172. For example, the controller 110 allows a user to select or execute a shortcut icon (not shown) displayed on the touch screen 171 in response to a touch event or a hovering event. Further, the touch screen controller 172 may be included in the controller 110.

Hereinafter, the methods according to various embodiments of the present disclosure may be implemented in a program command type which may be executed through various computing means, and may be recorded in a computer readable medium. The computer-readable recording medium may be non-volatile and may include a program instruction, a data file, a data structure, and the like individually, or combinations thereof. The program instruction recorded in the computer-readable medium may be one which is specifically designed and configured for the present disclosure, or may be well-known to and used by a person ordinarily skilled in the art of computer software.

Also, the methods according to the various embodiments of the present disclosure may be implemented in a program instruction form and stored in the storage unit 150 of the above-described mobile apparatus 100, and the program instruction may be temporarily stored in the RAM 113 included in the controller 110 so as to execute the methods according to the various embodiments of the present disclosure. Accordingly, the controller 110 may perform the control of hardware components included in the mobile apparatus 100 in response to the program instruction according to the methods of the various embodiments of the present disclosure, temporarily or continuously store the data produced while executing the methods according to the various embodiments in the storage unit 150, and provide UIs required for executing the methods according to the various embodiments of the present disclosure to the touch screen controller 172.

Figure 2:
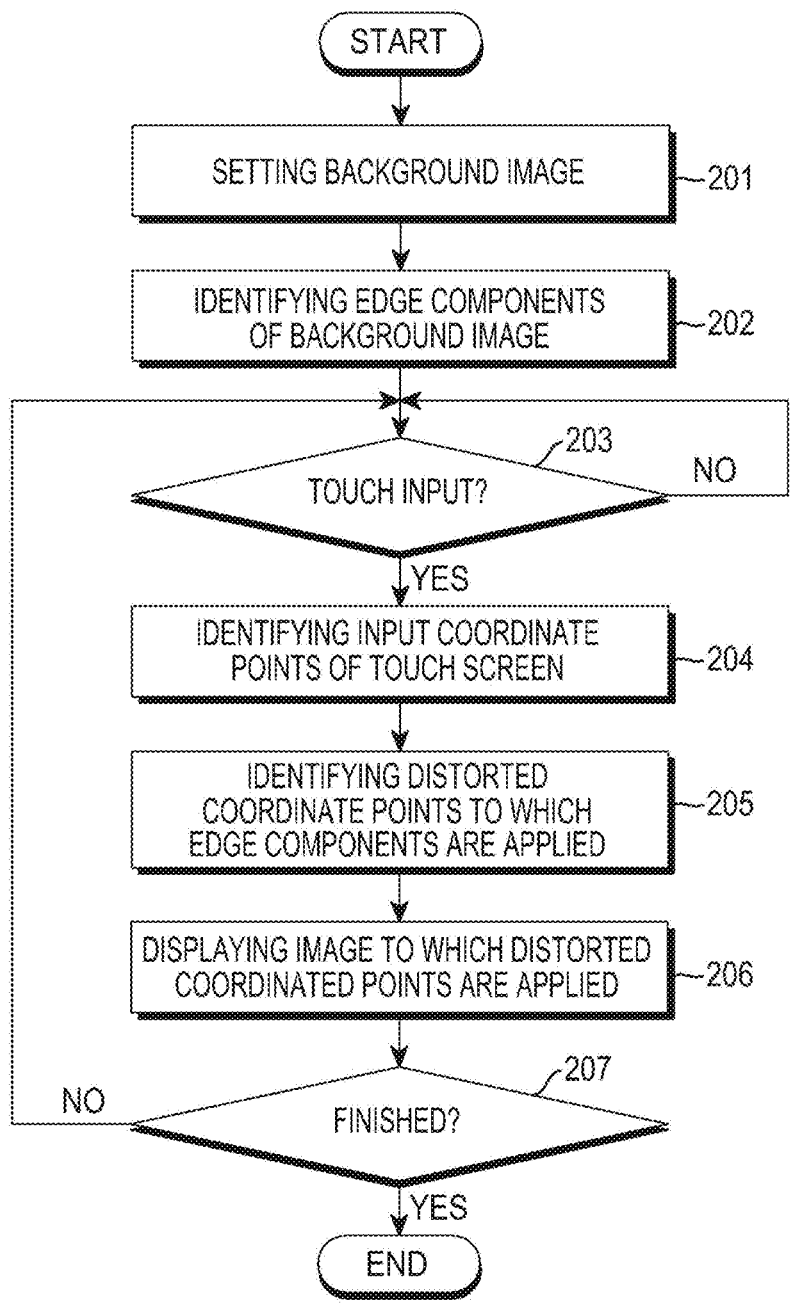
FIG. 2 is a flowchart illustrating an operation sequence of a method of processing an image according to an embodiment of the present disclosure.
Figure 3A:
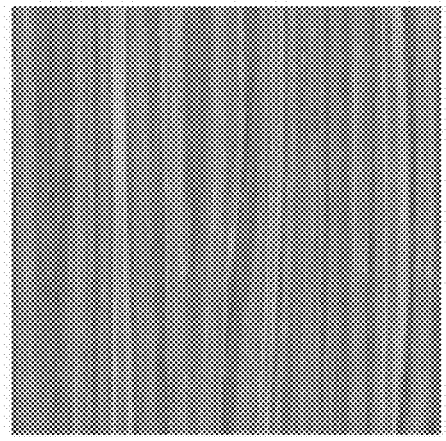
FIGS. 3A, 3B, 3C, and 3D are views illustrating background images which are used for a method of processing the image according to an embodiment of the present disclosure.
Figure 3B:
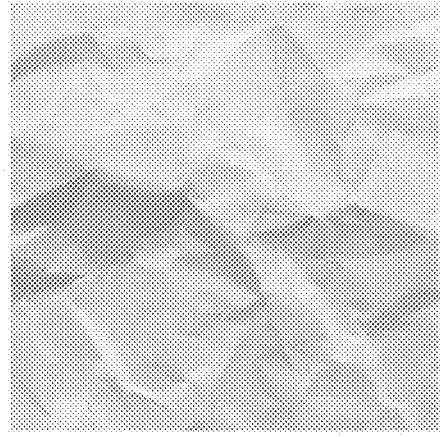
Figure 3C:
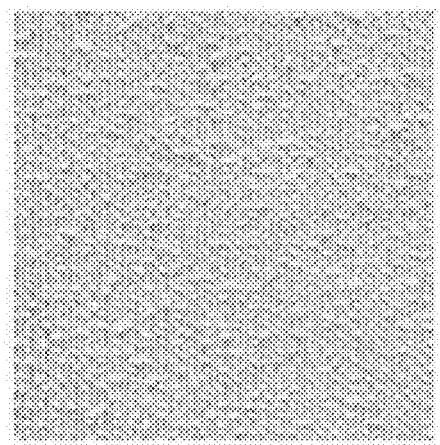
Figure 3D:
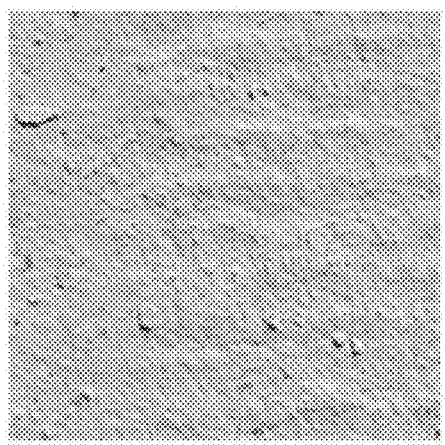
Figure 4:
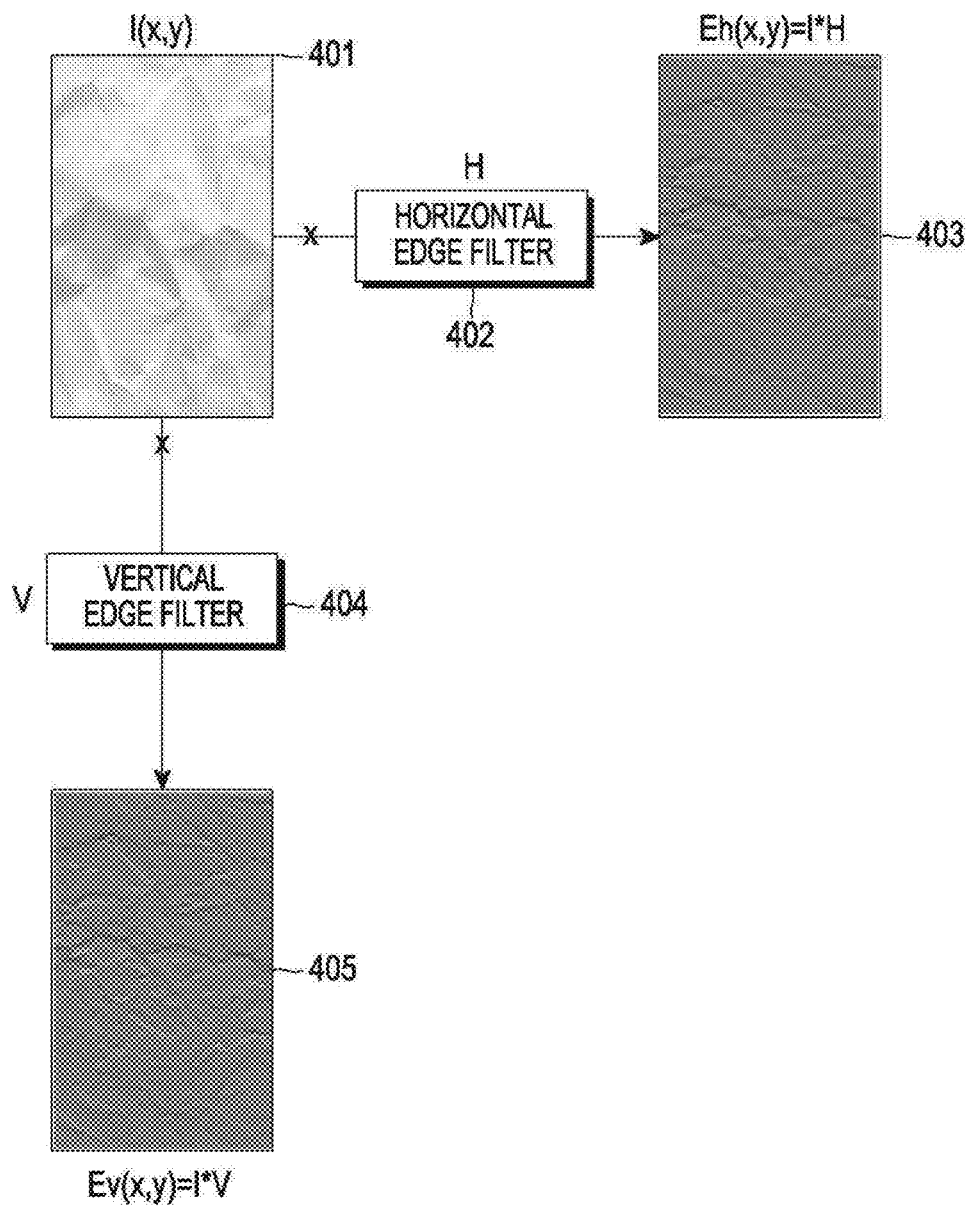
FIG. 4 is a view illustrating an example of edge components which are detected by a method of processing an image according to an embodiment of the present disclosure.

FIG. 2 is a flowchart illustrating an operation sequence of a method of processing an image according to an embodiment of the present disclosure; FIGS. 3A, 3B, 3C, and 3D are views illustrating background images which are used for a method of processing the image according to an embodiment of the present disclosure; and FIG. 4 is a view illustrating an example of edge components which are detected by a method of processing an image according to an embodiment of the present disclosure.

Referring to FIGS. 2, 3A, 3B, 3C, and 3D, and 4, a method of processing the image according to an embodiment of the prevent disclosure may be started as an application, such as a drawing application and a note application, which connects points input by touches so as to display a line or a surface.

First, in operation 201, the controller 110 selects and sets a background image on which the line or the surface is displayed. The selection of the background image is achieved by reading a background image, which is predetermined by a user, from the storage unit 150, or by providing background images stored in the storage unit 150 to the touch screen 171 in order for a user to select a background image. For example, the background images may be images including texture of various materials such as white paper, Chinese drawing paper, crumpled paper, corrugated cardboard, wood, sand, earth, fiber, cement, asphalt and stone, and examples of the background images are shown in FIGS. 3A to 3D. Furthermore, the present disclosure is not limited thereto, and the background images may be any suitable and/or similar image for a background.

Next, in operation 202, the controller 110 identifies edge components of the background image. The edge components may be detected from the selected background image in real time. The edge components of the background image can be detected by applying an edge filter to the background image. Furthermore, the edge components of the background image may include a vertical edge component and a horizontal edge component, and the vertical and horizontal edge components may be detected by applying a vertical edge filter and a horizontal edge filter to the background image. Particularly, referring to FIG. 4, the horizontal edge filter 402 is applied to the background image 401 by a unit of pixels so as to detect a horizontal edge component 403, while a vertical edge filter 404 is applied to the background image 401 by a unit of pixels so as to detect a vertical edge component 405.

Although, in the present embodiment of the present disclosure, the edge components are detected by using the vertical and horizontal edge filters, the present disclosure is not limited to such an embodiment. Of course, it will be understood that a person skilled in the art to which the present disclosure belongs can modify the present disclosure. For example, the edge component of the background image may be detected by applying a diagonal filter to the background image. Of course, the edge components may be detected by applying at least one or combinations of the horizontal edge filter, the vertical edge filter and the diagonal filter, or any other similar and/or suitable filter, method, process, and/or operation that detects and edge.

Although it is illustrated in the embodiment of the present disclosure that the edge components are detected from the background image in real time, the present disclosure is not limited to such an embodiment. For example, the edge components for each background image may be previously detected and stored in the storage unit 150. Accordingly, when the background image is selected, the edge components for the background image may be detected by reading the edge components corresponding to the selected background image from the storage unit 150.

Figure 5A:
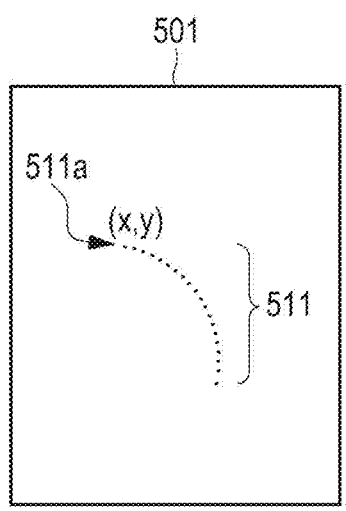
FIG. 5A is a view illustrating an example of an input coordinate which is detected by a method of processing an image according to an embodiment of the present disclosure.
Figure 5B:
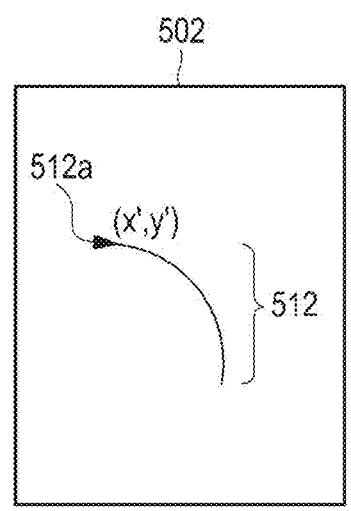
FIG. 5B is a view illustrating an example of a display coordinate which is detected by a method of processing an image according to an embodiment of the present disclosure.
Figure 6:
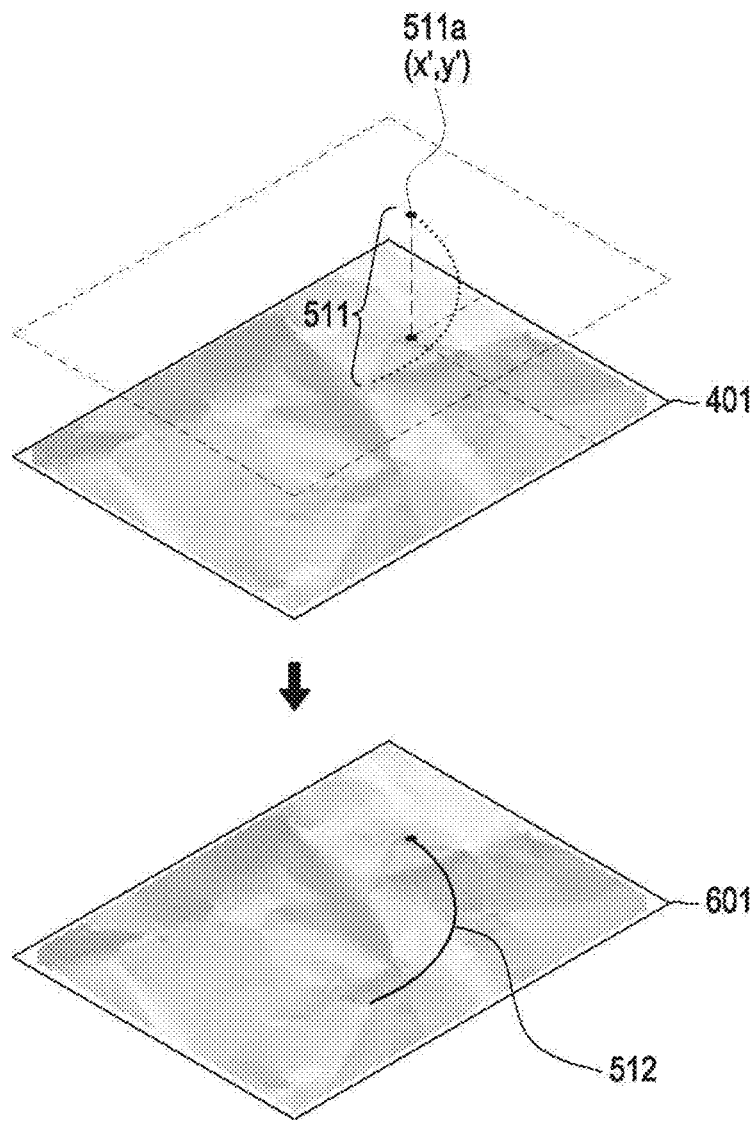
FIG. 6 is a view illustrating an image which is displayed by using a background image and a display coordinate in a method of processing an image according to an embodiment of the present disclosure.
Figure 7:
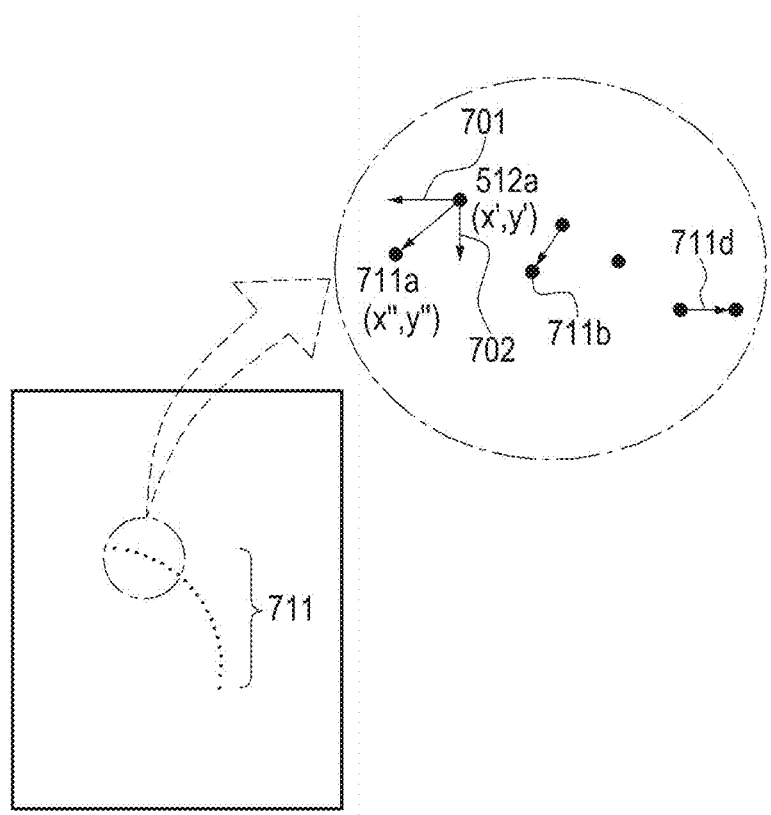
FIG. 7 is a concept view illustrating a distorted coordinate in a method of processing an image according to an embodiment of the present disclosure.

FIG. 5A is a view illustrating an example of an input coordinate which is detected by a method of processing an image according to an embodiment of the present disclosure; FIG. 5B is a view illustrating an example of a display coordinate which is detected by a method of processing an image according to an embodiment of the present disclosure; FIG. 6 is a view illustrating an image which is displayed by using a background image and a display coordinate in a method of processing an image according to an embodiment of the present disclosure; and FIG. 7 is a concept view illustrating a distorted coordinate in a method of processing an image according to an embodiment of the present disclosure.

Referring to FIGS. 2, 5A and 5B, the touch screen 171 includes a touch panel 501 (see FIG. 5A) with a first sized resolution and a display panel 502 (see FIG. 5B) with a second sized resolution. The controller 110, in operation 203, determines whether a touch input has been inputted to the touch panel 501, and then, the touch panel 501, in operation 204, detects and identifies at least one coordinate point 511, hereinafter, referred to as 'input coordinate point', corresponding to a region in which a touch is input by a user, based on the first sized resolution, and provides the controller 110 with the at least one detected input coordinate point 511 through the touch screen controller 172. Then, the controller 110 identifies a coordinate point, hereinafter, referred to as 'display coordinate point', at which the at least one input coordinate point 511 is displayed on the display unit, considering the second sized resolution, and connects the at least one display coordinate point to produce a line 512, which may also be a surface 512, so as to display the line 512 or the surface 512 on the display panel 502 through the touch screen controller 172.

Referring to FIG. 6, furthermore, with a display of the line 512, or the surface 512, on the display panel 502, the background image 401 and the line 512, or the surface 512, are combined and displayed. At this time, when the line 512, or the surface 512, which is produced by a reference of the input coordinate point 511, is displayed to simply overlap the background image 401, it may cause a problem in that the line 512, or the surface 512, is not naturally harmonized with the background image 401 which may have various shapes or qualities, but is heterogeneously expressed. Therefore, the controller 110, which performs the method of processing the image according to the present disclosure, identifies the at least one input coordinate point 511 in operation 204, and distorts and outputs the line 512, or the surface 512, so that the background image 401 and the line 512, or the surface 512, are naturally harmonized with each other in operations 205 and 206, in order to generate a harmonized background image 601.

Particularly, in operation 205, the controller 110 identifies a coordinate point, hereinafter, referred to as 'distorted coordinate point', which is distorted by applying the edge components detected in operation 202 to the input coordinate point 511 identified in operation 204. For example, with the illustration of a first input coordinate point 511a (see FIG. 5A), in operation 204, when receiving an input of a coordinate (x, y) of the first input coordinate point 511a, the controller 110 calculates a coordinate (x', y') of a first display coordinate point 512a corresponding to the first input coordinate point 511a in consideration of the display resolution. Then, the controller 110 identifies edge components, which correspond to the coordinate (x', y') of the first display coordinate point 512a, from among the edge components of the background image 401.

Referring to FIG. 7, after the controller 110 identifies the edge components, the controller 110 then calculates a distorted coordinate point 711a, which is coordinates (x", y") obtained by distorting the coordinate (x', y') of the first display coordinate point 512a enough to correspond to the identified edge components, i.e. a horizontal edge component 701 and a vertical edge component 702. The controller 110 calculates all distorted coordinate points 711, which includes distorted points 711b and 711d, for the at least one input coordinate point 511 in such a manner as described above.

Figure 8:
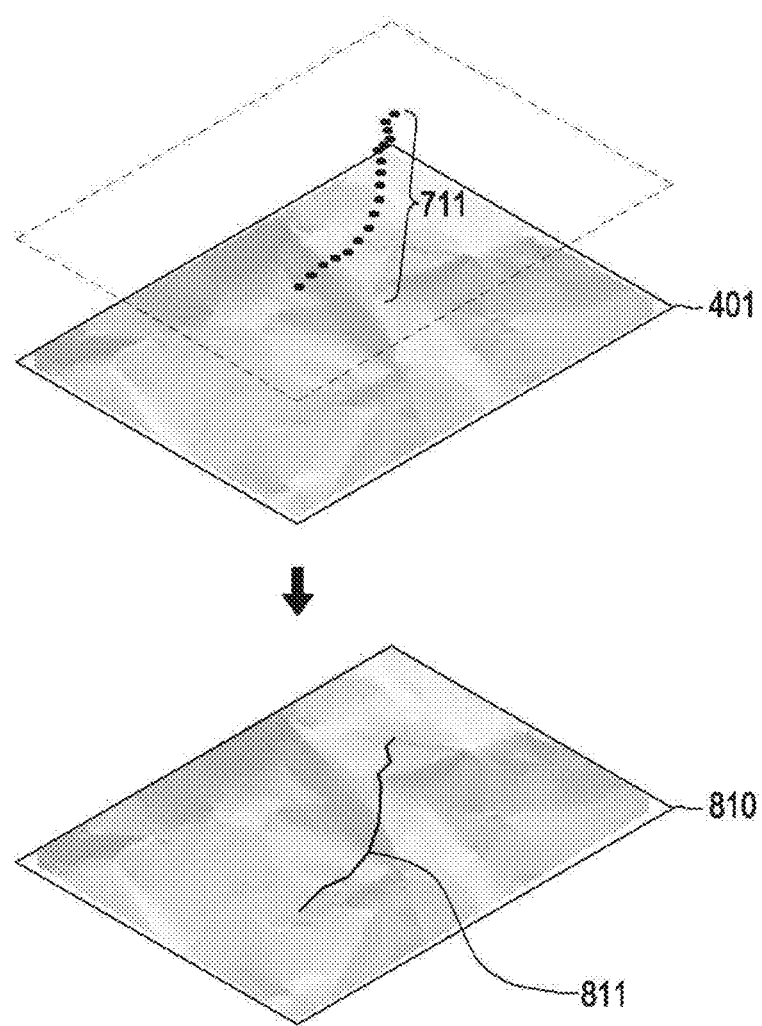
FIG. 8 is a view illustrating an image which is displayed by using a background image and a distorted coordinate in a method of processing an image according to an embodiment of the present disclosure.
Figure 9A:
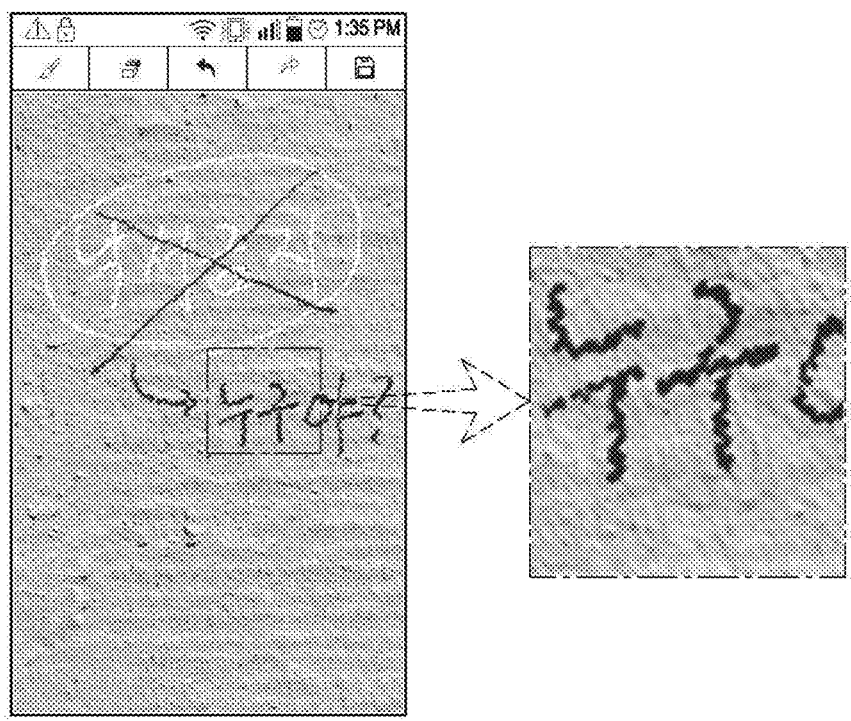
FIGS. 9A, 9B, 9C, 9D, and 9E are views illustrating examples of images which are displayed on a touch screen according to a method of processing an image according to an embodiment of the present disclosure.
Figure 9B:
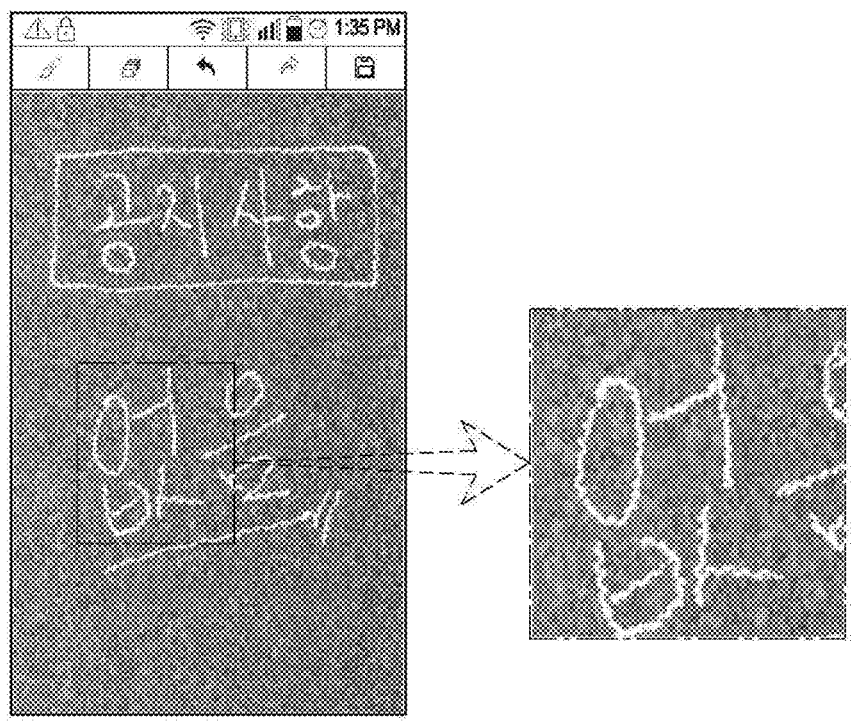
Figure 9C:
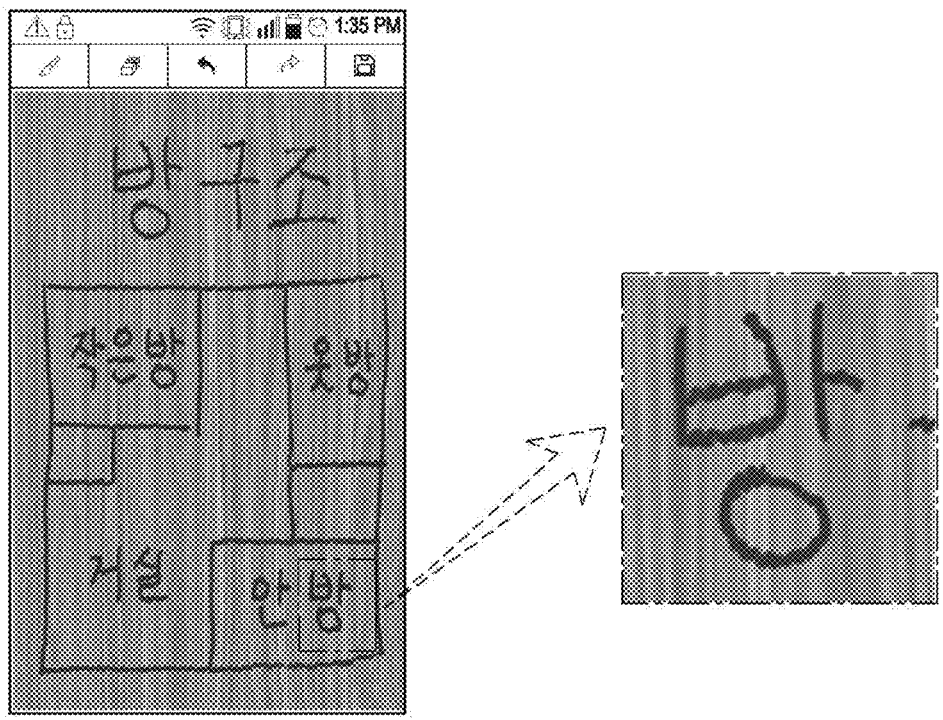
Figure 9D:
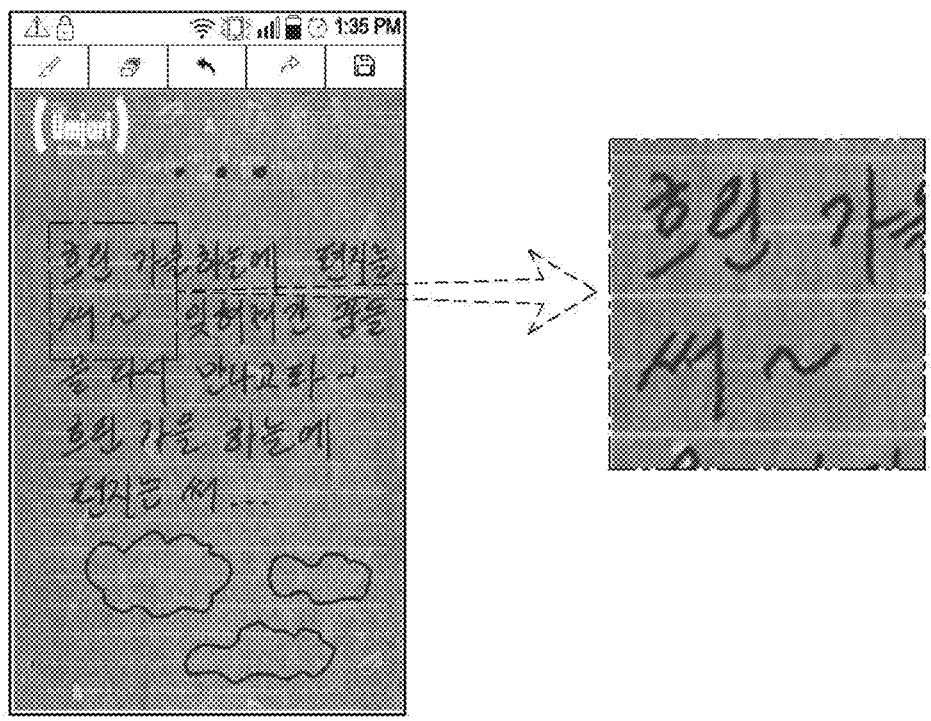
Figure 9E:
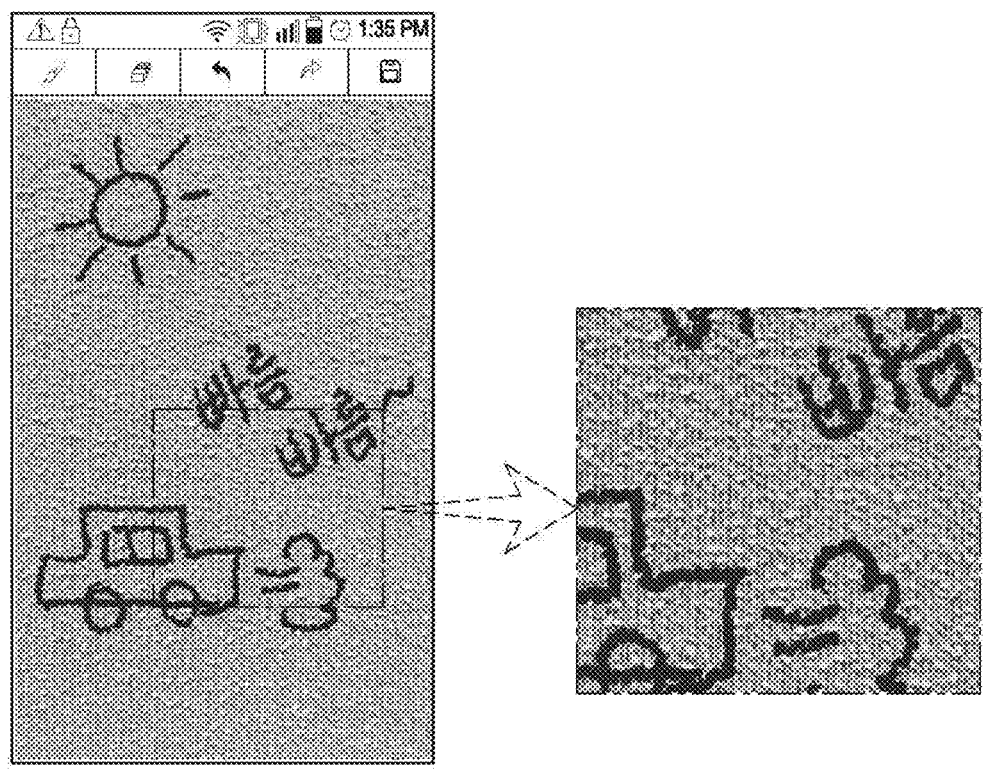

FIG. 8 is a view illustrating an image which is displayed by using a background image and a distorted coordinate in a method of processing an image according to an embodiment of the present disclosure; and FIGS. 9A, 9B, 9C, 9D, and 9E are views illustrating examples of images which are displayed on a touch screen according to a method of processing an image according to an embodiment of the present disclosure.

Referring to FIGS. 2 and 8, in operation 206, the controller 110 displays the image to which the distorted coordinate points 711 are applied by connecting the distorted coordinate points 711 to one another so as to produce a distorted line 811, or a surface 811, as shown in FIG. 8, and the controller 110 makes the distorted line 811 overlap the background image 401 so as to display the distorted line 811 overlapping in the overlapped background image 810, and as shown in further detail in FIGS. 9A to 9E.

In operation 207, the controller 110 determines whether the method of processing the image is finished, and if not, the controller 110 repeatedly performs the above-mentioned operations 203 to 206 until a corresponding application is finished. For example, the finishing operation may be carried out based on an input of a finishing key by a user or an operation policy of the mobile terminal. The operation policy may be a policy, in which a state that a corresponding application is not displayed on the display unit, but is in a standby mode or an inactivated mode, or a state that the corresponding application is not displayed on the display unit is continuous for a predetermined time, so as to finish the corresponding application.

Figure 10:
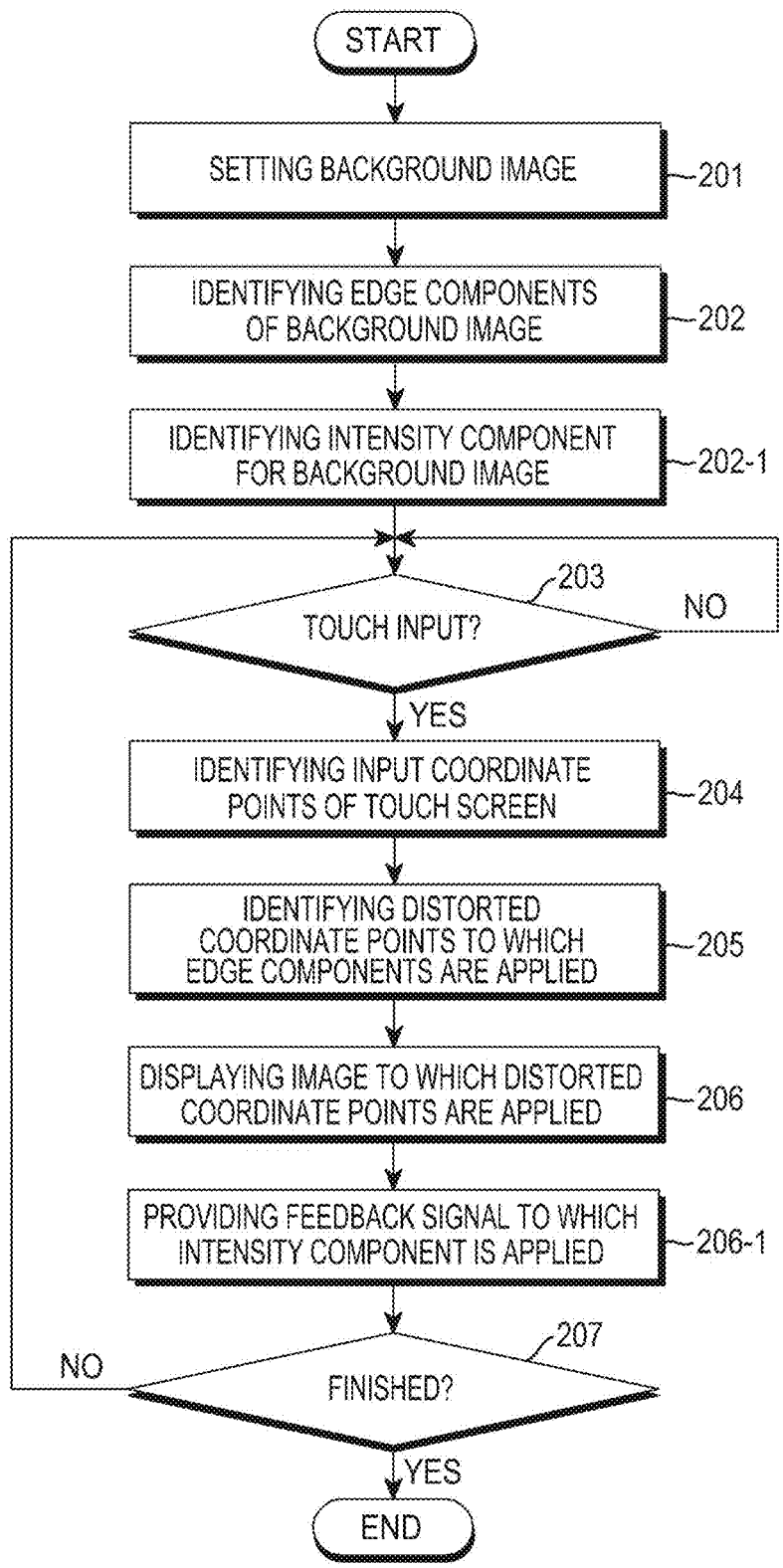
FIG. 10 is a flowchart illustrating an operation sequence of a method of processing an image according to an embodiment of the present disclosure.

FIG. 10 is a flowchart illustrating an operation sequence of a method of processing an image according to an embodiment of the present disclosure.

Referring to FIG. 10, the method of processing the image according to an embodiment of the present disclosure, as illustrated in FIG. 10, is similar to the method of processing the image according to the embodiment illustrated in FIG. 2. However, the method of processing the image according to the embodiment of the present disclosure, as illustrated in FIG. 10, has a difference in that the method provides an operation of displaying a distorted line or surface on a region corresponding to the touch input, and in addition, displays a feedback effect corresponding to the edge components of the background image. To do this, the method of processing the image according to the embodiment of the present disclosure, as illustrated in FIG. 10, further includes operation 202-1 of identifying an intensity component for the background image, wherein the intensity component is needed for providing the feedback effect and operation 206-1 of outputting the feedback effect, in comparison with the method of processing the image according to the embodiment of FIG. 2.

Hereinafter, a detailed process of the method of processing the image according to the embodiment of the present disclosure, as illustrated in FIG. 10, will be described. A operation of performing a process identical to that of the method of processing the image according to the embodiment of FIG. 2 will be denoted by a reference numeral identical to that in the flowchart of FIG. 2 of the method of processing the image according to the embodiment of FIG. 2, and described with reference to the description of the method of processing the image according to the embodiment illustrated in FIG. 2.

First, the method of processing the image according to the embodiment of the present disclosure, as illustrated in FIG. 10, may be started as an application such as a drawing application and a note application which connects points input by touches so as to display the connected points as a distorted line or a surface is operated, similarly to the embodiment of FIG. 2.

In operation 201, the controller 110 selects and sets a background image on which the distorted line or the surface is displayed, and in operation 202, the controller 110 identifies the edge components of the background image. Next, in operation 202-1, the controller 110 detects an intensity component for the background image by using the identified edge components. For example, the intensity component can be obtained by multiplying the edge components by themselves.

Figure 11:
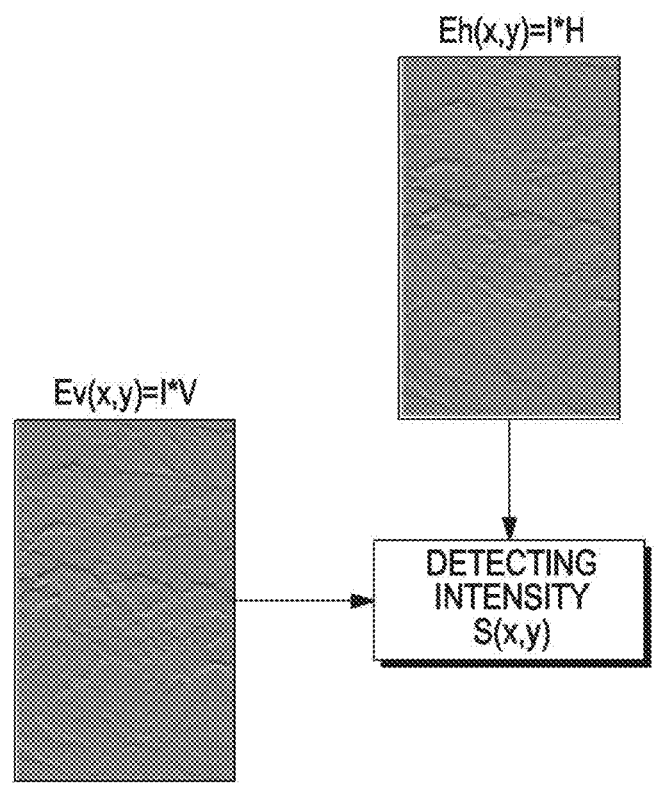
FIG. 11 is a view illustrating an operation of detecting an intensity component (S(x, y)) in a method of processing an image according to an embodiment of the present disclosure.

FIG. 11 is a view illustrating an operation of detecting an intensity component (S(x, y)) in a method of processing an image according to an embodiment of the present disclosure.

Referring to FIG. 11, the edge components include a vertical edge component (Ev(x, y)) and a horizontal edge component (Eh(x, y)). The intensity component (S(x,y)) can be obtained by adding a value obtained by multiplying the vertical edge component (Ev(x, y)) by itself to a value obtained by multiplying the horizontal edge component (Eh(x, y)) by itself, as shown in Equation 1 below.

$$S(x,y)Ev(x,y)^2+Eh(x,y)^2 \qquad \text{Equation 1}$$

Although it is illustrated in the embodiment of the present disclosure that the intensity component is calculated by Equation 1, the present disclosure is not limited to such an embodiment. According to a property of the application, either the vertical component or the horizontal component may be used as the intensity component, and also a maximum value of the vertical component and the horizontal component may be used as the intensity component. Of course, it will be understood by a person skilled in the art that the present disclosure can be variously modified such that the intensity component (S(x,y)) may be calculated according to any suitable method and/or operation.

The controller 110, in operation 203, determines whether a touch input has been inputted to the touch panel 501, and then, in operation 204, the controller 110 identifies at least one input coordinate point 511 corresponding to a region in which a touch input is generated when the touch input is generated in operation 203. Then, the controller 110 distorts the line 512 or the surface 512 to produce and output a distorted line 811 so that the background image 401 and the line 512 or the surface 512 harmonize with each other, in operations 205 and 206.

In operation 206-1, the controller 110 outputs a feedback signal, i.e. a voice signal or a vibration signal, with a size corresponding to the intensity component (S(x, y)).

Figure 12A:
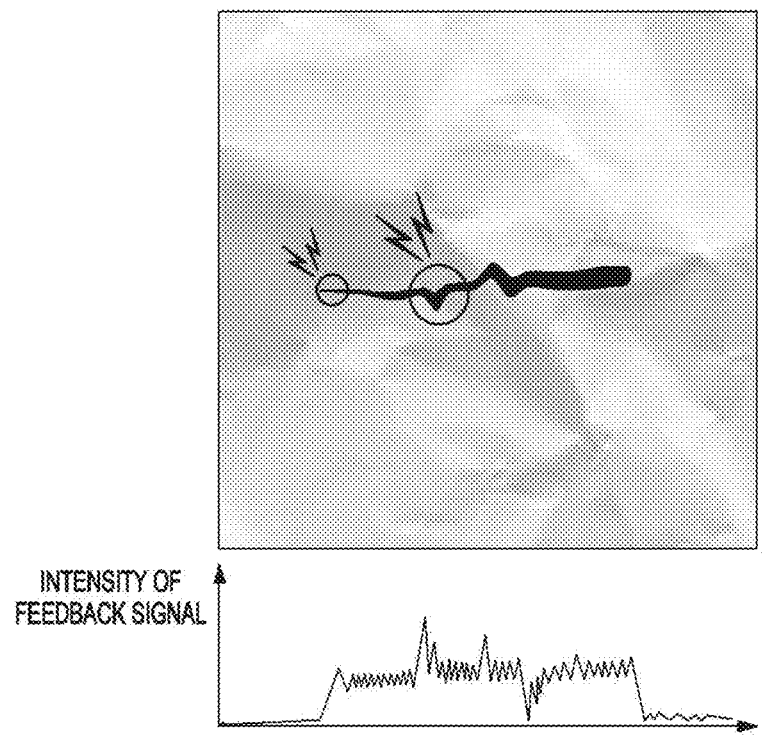
FIG. 12A is a view illustrating an example of an output display signal and a feedback signal in a method of processing an image according to an embodiment of the present disclosure.
Figure 12B:
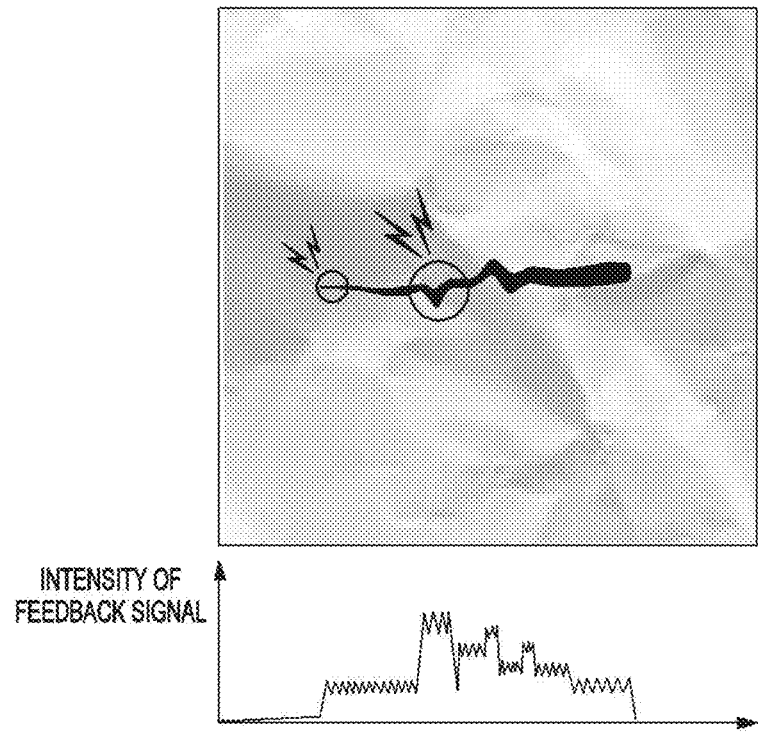
FIG. 12B is a view illustrating another example of an output display signal and a feedback signal in a method of processing an image according to an embodiment of the present disclosure.

FIG. 12A is a view illustrating an example of an output display signal and a feedback signal in a method of processing an image according to an embodiment of the present disclosure; and FIG. 12B is a view illustrating another example of an output display signal and a feedback signal in a method of processing an image according to an embodiment of the present disclosure.

Referring to FIG. 12A, the controller 110 is capable of outputting the feedback signal such that it corresponds to a magnitude of the intensity component (S(x, y)). Referring to FIG. 12B, as an alternative plan, the controller 110 sets at least one critical value by stages to output the feedback signal, and may output the feedback signal of a level corresponding to the magnitude of the intensity component (S(x, y)).

The controller 110 repeatedly performs the above-mentioned operations 203 to 206-1 until a corresponding application is finished. For example, the finishing operation may be carried out based on an input of a finishing key by a user or an operation policy of the mobile terminal. That is, the operation policy may be a policy in which a state that a corresponding application is not displayed on the display unit but is in a standby mode or an inactivated mode, or a state that the corresponding application is not displayed on the display unit is continuous for a predetermined time, so as to finish the corresponding application.

Figure 13:
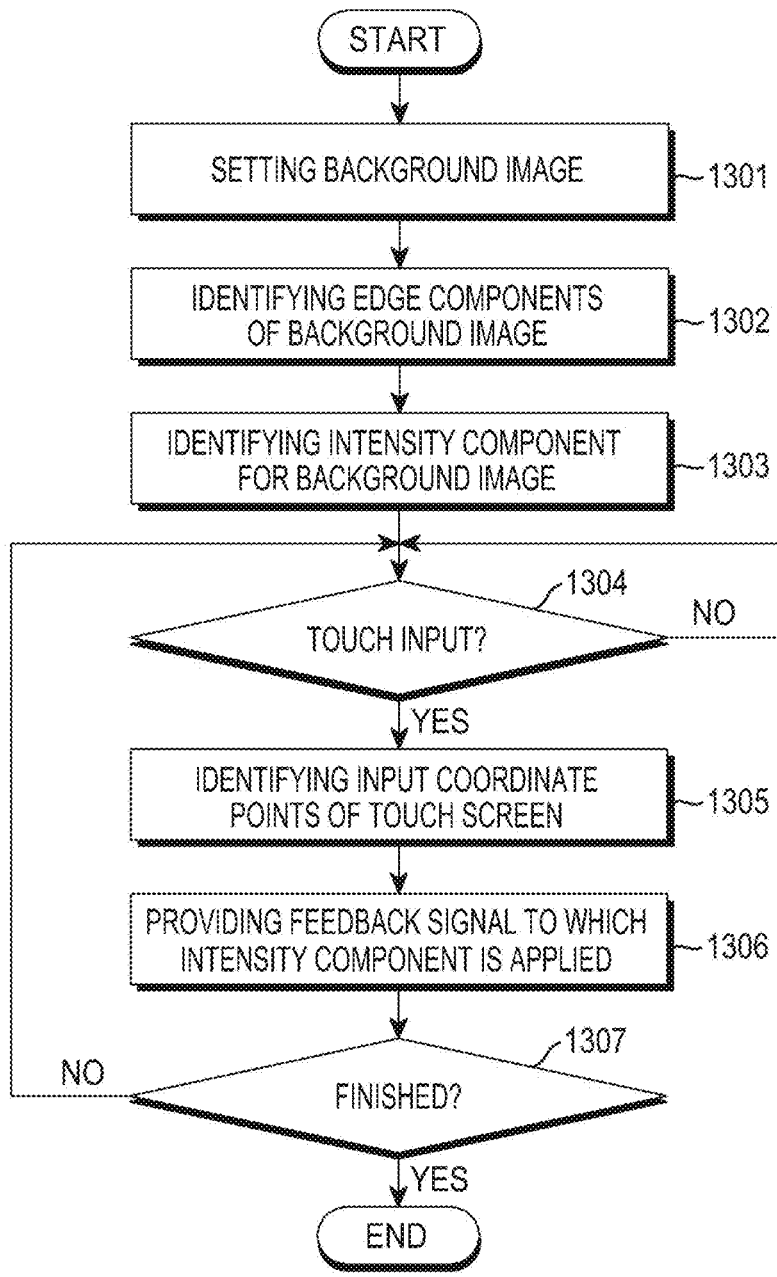
FIG. 13 is a flowchart illustrating an operation sequence of a method of processing an image according to an embodiment of the present disclosure.

FIG. 13 is a flowchart illustrating an operation sequence of a method of processing an image according to an embodiment of the present disclosure.

The method of processing the image according to the embodiment of the present disclosure, as illustrated in FIG. 13, does not carry out a process of displaying a line or a surface on a region corresponding to a touch input, differently from the method of processing the image according to the embodiment of FIG. 10, but provides a feedback effect corresponding to edge components of a background image.

In the description of a detailed process of the image processing method according to the embodiment of the present disclosure, as illustrated in FIG. 10, a step of performing a process identical to that of the method of processing the image according to the embodiment of FIG. 2 or the embodiment of FIG. 10 will be described in detail with reference to the description of the method of processing the image according to the embodiment of FIG. 2 or the embodiment of FIG. 10.

Since the method of processing the image according to the embodiment of the present disclosure, as illustrated in FIG. 13, does not perform a process of displaying a line or a surface on a region corresponding to a touch input, the method may be started by executing an application such as a graphic application which merely displays images.

Although it is illustrated in the embodiment of the present disclosure, as illustrated in FIG. 13, that the method of processing the image is started as the application of displaying the images is executed, the present disclosure is not limited to such an embodiment. Of course, it will be understood that the present disclosure can be applied to various applications of providing a corresponding image with a feedback effect while displaying the images. For example, the method of processing the image according to the embodiment of the prevent disclosure, as illustrated in FIG. 13, may be applied to an application, such as a drawing application and a note application, which connects points input by touches so as to display a line or a surface.

In the method of processing the image according to the embodiment of FIG. 13, the controller 110 selects and sets a background image, on which the line or the surface is displayed, in operation 1301, and identifies the edge components of the background image in operation 1302. Next, in operation 1303, the controller 110 detects an intensity component for the background image by using the identified edge components. Operation 1301 corresponds to operation 201 described above, operation 1302 corresponds to operation 202, and operation 1303 corresponds to operation 202-1 described above, and thus, operations 1301, 1302 and 1303 are not fully described with reference to the embodiment of FIG. 13 as detailed description of the operations 1301, 1302, and 1303 may be found in the descriptions of the embodiment of FIG. 2.

On the other hand, in operation 1304 the controller 110 determines whether a touch input has been inputted, and in operation 1305 identifies at least one input coordinate point 511 corresponding to a region of the touch panel 501 in which the touch input is generated.

In operation 1306, then, the controller 110 provides a feedback signal to which the intensity component is applied, or in other words, the controller 110 outputs the feedback signal, i.e. a voice signal or a vibration signal, with a size corresponding to the intensity component (S(x, y)). At operation 1307, the controller 110 determines whether the method of processing an image is finished.

Figure 14A:
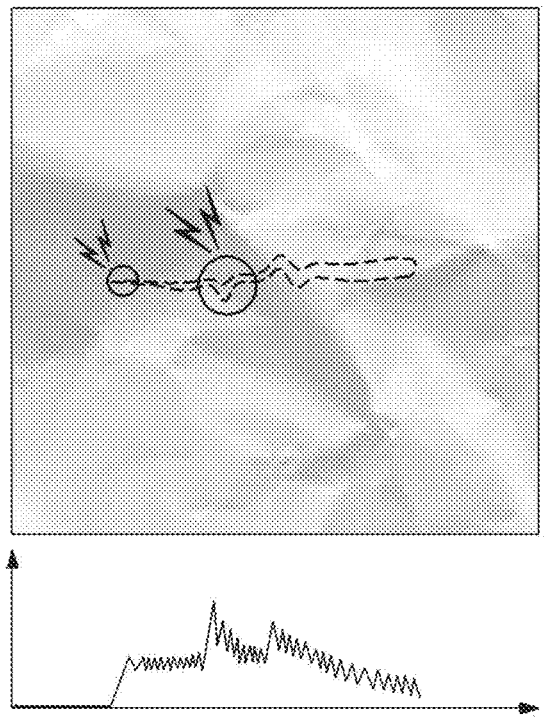
FIG. 14A is a view illustrating an example of an output display signal and a feedback signal in a method of processing an image according to an embodiment of the present disclosure.
Figure 14B:
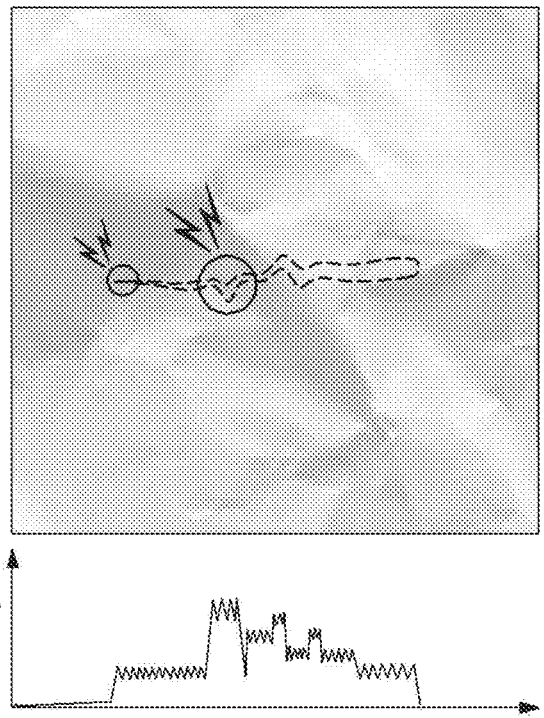
FIG. 14B is a view illustrating another example of an output display signal and a feedback signal in a method of processing an image according to an embodiment of the present disclosure.

FIG. 14A is a view illustrating an example of an output display signal and a feedback signal in a method of processing an image according to an embodiment of the present disclosure; FIG. 14B is a view illustrating another example of an output display signal and a feedback signal in a method of processing an image according to an embodiment of the present disclosure.

Referring to FIG. 14A, the controller 110 is capable of outputting the feedback signal according to a size of the intensity component (S(x, y)). Referring to FIG. 14B, as an alternative plan, the controller 110 sets at least one critical value by stages to output the feedback signal, and may output the feedback signal of a level corresponding to the size of the intensity component (S(x, y)).

The controller 110 repeatedly performs the above-mentioned operations 1304 to 1306 till a corresponding application is finished, as determined in operation 1307. For example, the finishing operation may be carried out based on an input of a finishing key by a user or an operation policy of the mobile terminal. That is, the operation policy may be a policy in which a state that a corresponding application is not displayed on the display unit but is in a standby mode or an inactivated mode, or a state that the corresponding application is not displayed on the display unit is continuous for a predetermined time, so as to finish the corresponding application.

Figure 15:
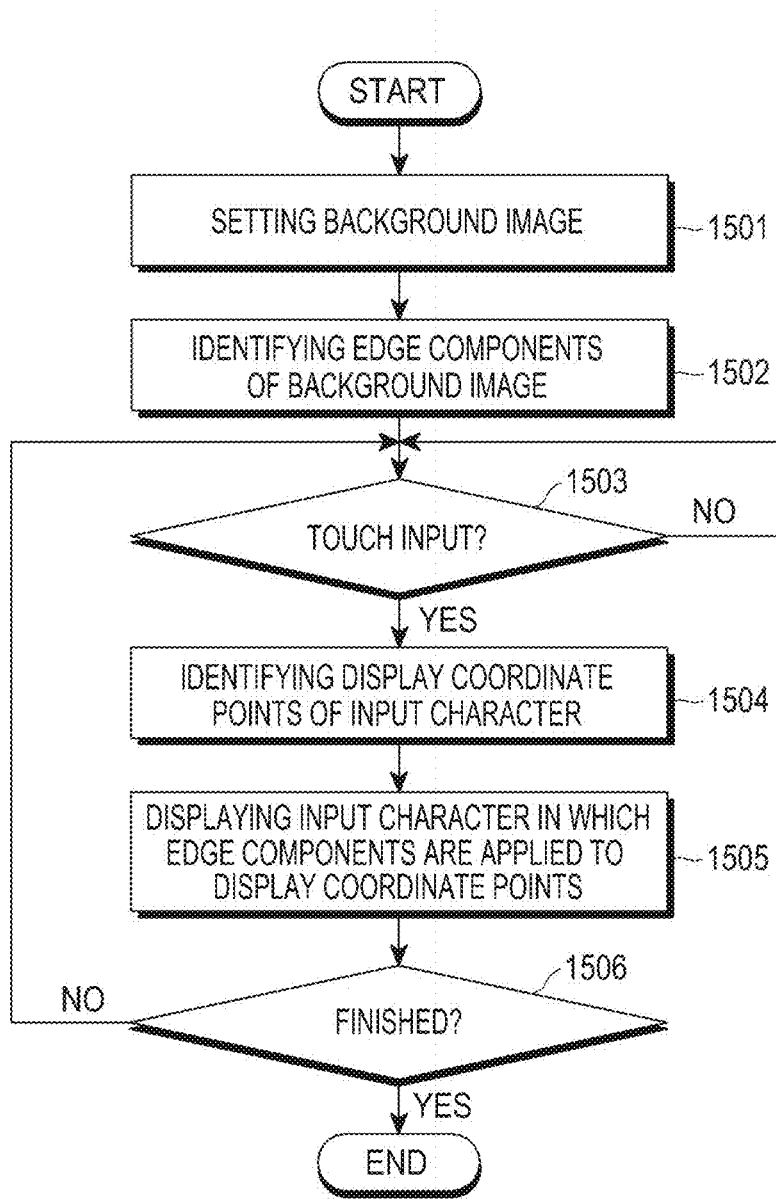
FIG. 15 is a flowchart illustrating an operation sequence of a method of processing an image according to an embodiment of the present disclosure.

FIG. 15 is a flowchart illustrating an operation sequence of a method of processing an image according to an embodiment of the present disclosure.

The method of processing the image according to the embodiment of the present disclosure, as illustrated in FIG. 15, is similar to the method of processing the image according to the embodiment of FIG. 2. However, the method of processing the image according to the embodiment of the present disclosure, as illustrated in FIG. 15, displays input characters and the background image by applying a shape or quality of the background image to the display unit when the characters input through not a touch input but a key pad, i.e. a keyboard and a virtual keyboard, are displayed along with the background image on the display unit.

In the description of a detailed process of the image processing method according to the embodiment of the present disclosure as illustrated in FIG. 15, an operation of performing a process identical to that of the method of processing the image according to the embodiment of FIG. 2 or the embodiment of FIG. 10 will be described in detail with reference to the description of the method of processing the image according to the embodiment of FIG. 2 or the embodiment of FIG. 10.

First, the method of processing the image according to the embodiment of the present operation, as illustrated in FIG. 15, may be started according to execution of an application, such as a drawing application and a note application, which displays predetermined characters on the background image, similarly to the embodiment of FIG. 2.

In operation 1501, the controller 110 selects and sets a background image on which the distorted line or the surface is displayed, and in operation 1502, identifies the edge components of the background image.

Figure 16:
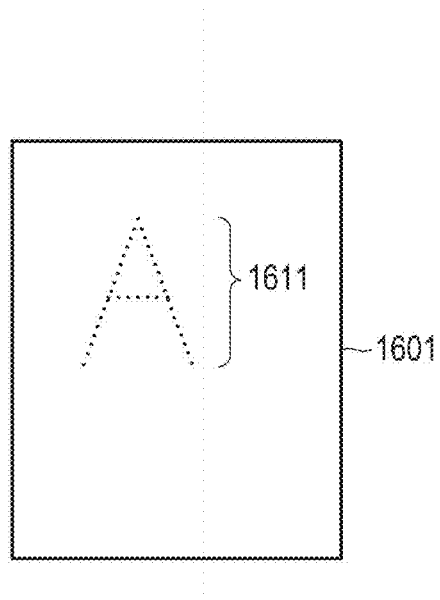
FIG. 16 is a view illustrating a display coordinate of an input character in a method of processing an image according to an embodiment of the present disclosure.
Figure 17:
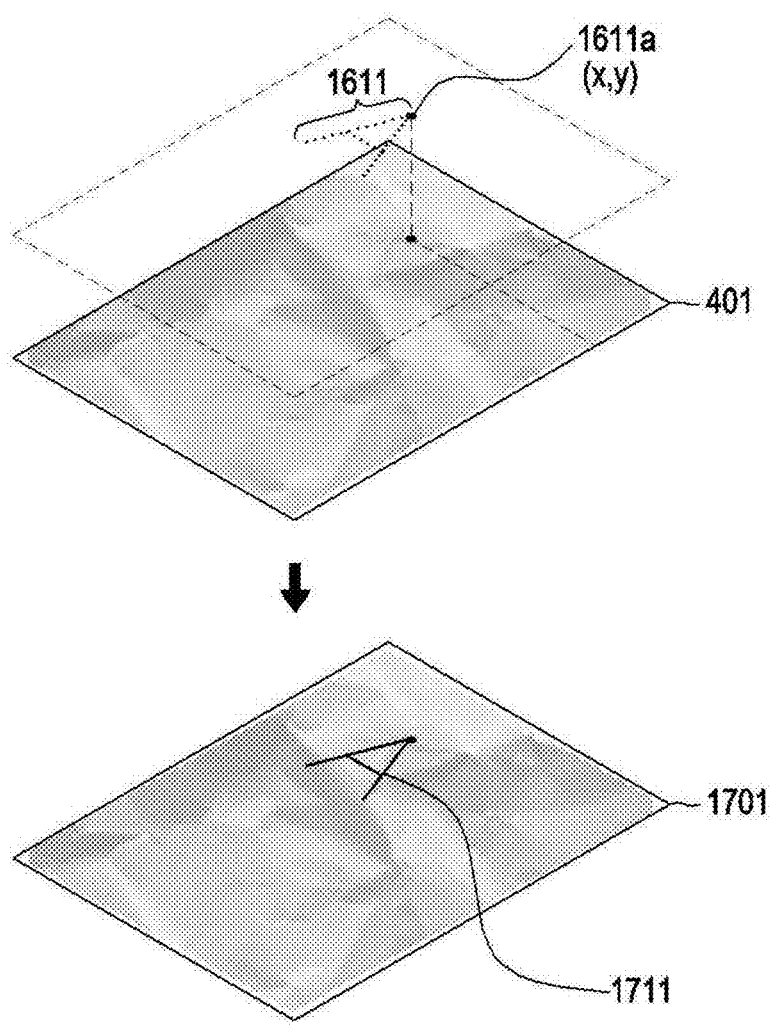
FIG. 17 is a view illustrating an image which is displayed by using a background image and a display coordinate of an input character in a method of processing the image according to an embodiment of the present disclosure.
Figure 18:
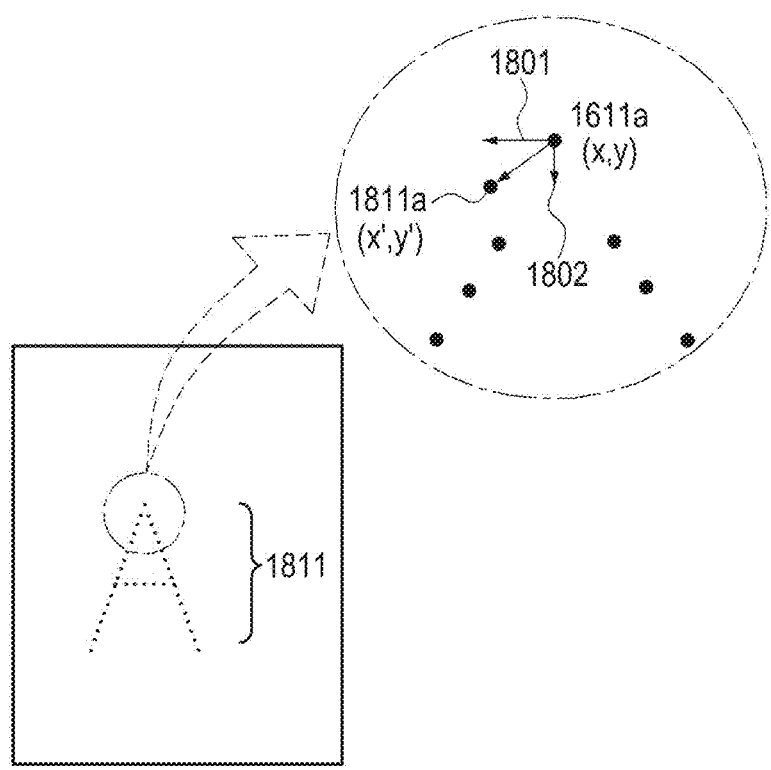
FIG. 18 is a concept view illustrating a distorted coordinate of an input character in a method of processing an image according to an embodiment of the present disclosure.
Figure 19:
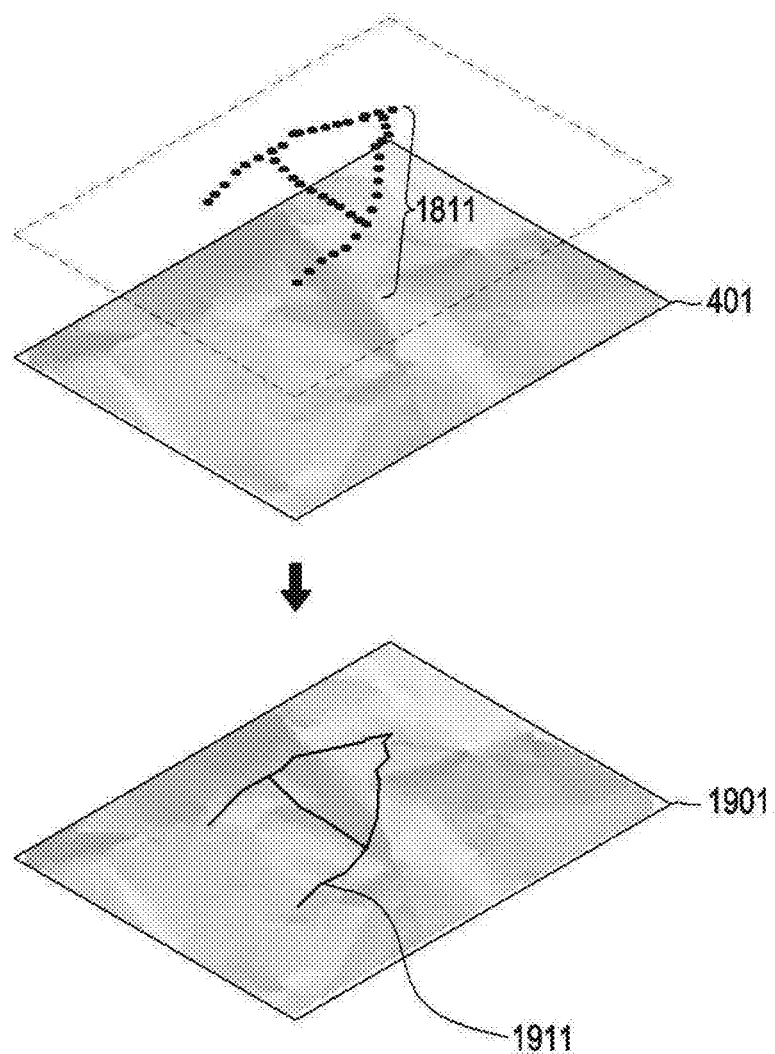
FIG. 19 is a view illustrating an image which is displayed by using a background image and a distorted coordinate in a method of processing an image according to an embodiment of the present disclosure.

FIG. 16 is a view illustrating a display coordinate of an input character in a method of processing an image according to an embodiment of the present disclosure; FIG. 17 is a view illustrating an image which is displayed by using a background image and a display coordinate of an input character in a method of processing the image according to an embodiment of the present disclosure; FIG. 18 is a concept view illustrating a distorted coordinate of an input character in a method of processing an image according to an embodiment of the present disclosure; and FIG. 19 is a view illustrating an image which is displayed by using a background image and a distorted coordinate in a method of processing an image according to an embodiment of the present disclosure.

Referring to FIG. 16, on the other hand, the touch screen 171 is provided with a display panel 1601 with a predetermined sized display resolution, identifies a coordinate point, which may also be referred to as 'display coordinate point', at which a user displays the characters to be adjusted to the display resolution, and connects the one or more display coordinate points 1611, so that the characters input by the user can be displayed on the display panel through the touch screen controller 172.

Referring to FIG. 17, furthermore, when the characters input by the user are displayed on the display panel 1601, then the characters 1711 are displayed in combination with the background image 401 and the display coordinate point 1611 so as to display the combined background image 1701. At this time, when the characters 1711, which are produced by a combination of the display coordinate point 1611, are displayed to merely overlap the background image 401, it causes a problem in that the characters 1711 input by the user are not naturally harmonized with the background image 401 which may have various shapes or qualities, but are heterogeneously expressed. Therefore, the controller 110, in operation 1503, determines whether a touch input has been inputted, and then, in operation 1504, the controller 110, which performs the method of processing the image according to the embodiment of the present disclosure as illustrated in FIG. 15, identifies the display coordinate point 1611 of the input characters, which are the characters input by the user, and in operation 1504 outputs the characters formed by distorting the display coordinate point 1611 for the character input by the user so that the background image 401 and the characters 1711 input by the user harmonize with each other.

Particularly, in operation 1505, the controller 110 identifies a coordinate point, which may also be referred to as 'distorted coordinate point', which is distorted by applying the edge components detected in operation 1502 to the display coordinate point 1611 identified in operation 1504. In other words, the controller 110, in operation 1505, displays input characters in which edge components are applied to display coordinate points. For example, when a first display coordinate point 1611a is illustrated, then, in operation 1504, the controller 110 identifies a coordinate (x, y) of the first display coordinate point 1611a. Then, the controller 110 identifies edge components, which correspond to the coordinate (x, y) of the first display coordinate point 1611a, from among the edge components of the background image 401. Next, the controller 110 calculates a distorted coordinate point 1811a, which is a coordinate (x', y') obtained by distorting the coordinate (x, y) of the first display coordinate point 1611a enough to correspond to the identified edge components, i.e. a horizontal edge component 701 and a vertical edge component 702. The controller 110 calculates all distorted coordinate points 1811 for the at least one display coordinate point 1611 in such a manner as described above. Further, the controller 110 enables the characters 1911 on the overlapped background image 1901 (see FIG. 19), which are constituted of the at least one distorted coordinate point 1811, to overlap the background image 401, and displays the characters which overlap the background image as shown in FIG. 19. Additionally, directions 1801 and 1802 are direction in which the distorted coordinate points 1811 may be disposed.

The controller 110 repeatedly performs the above-mentioned operations 1503 to 1505 until a corresponding application is finished, as determined in operation 1506. For example, the finishing operation may be carried out based on an input of a finishing key by a user or an operation policy of the mobile terminal. That is, the operation policy may be a policy in which a state that a corresponding application is not displayed on the display unit but is in a standby mode or an inactivated mode, or a state that the corresponding application is not displayed on the display unit is continuous for a predetermined time, so as to finish the corresponding application.

It will be appreciated that the various embodiments of the present disclosure may be implemented in a form of hardware, software, or a combination of hardware and software. Any such software may be stored, for example, in a volatile or non-volatile storage device such as a Read Only Memory (ROM), a memory such as a Random Access Memory (RAM), a memory chip, a memory device, or a memory Integrated Circuit (IC), or a recordable optical or magnetic medium such as a Compact Disk (CD), a Digital Versatile Disk (DVD), a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure. Accordingly, the present disclosure includes a program for a code implementing the apparatus and method described in the appended claims of the specification and a machine-readable storage medium for storing the program.

Moreover, such a program as described above can be electronically transferred through an arbitrary medium, such as a communication signal transferred through cable or wireless connection, and the present disclosure properly includes the things equivalent to that.

Moreover, the above-described mobile terminal can receive the program from a program provision device which is connected thereto in a wired or wireless manner, and store the program. A program providing apparatus may include a program including instructions to perform a preset contents protection method, a memory configured to store information required for the contents protection method, a communication unit configured to perform wired or wireless communication, and a controller configured to control program transmission. When receiving a request for providing the program from a portable terminal, the program providing apparatus may provide the program to the portable terminal through a wire or wirelessly. Further, even when there is no request for providing the program from the portable terminal, for example, when the portable terminal is located within a particular place, the program providing apparatus may provide the program to the portable terminal through a wire or wirelessly.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of processing an image of an electronic device, the method comprising:
   identifying, by a controller of the electronic device, edge components of a background image by a unit of a predetermined size;
   identifying, by the controller, input coordinate points of a touch input which is input on a touch screen;

determining, by the controller, distorted coordinate points by applying the edge components to the input coordinate points; and displaying, by the controller, a drawing image which is formed by connecting the distorted coordinate points on the background image, wherein the determining of the distorted coordinate points by applying the edge components to the input coordinate points comprises moving the input coordinate points to horizontal and vertical coordinates corresponding to the edge components, by calculating the horizontal and vertical coordinates for the input coordinate points, wherein the identifying of the edge components comprises detecting a value of the vertical edge component and a value of the horizontal edge component by a predetermined unit, and wherein the moving of the input coordinate points to the horizontal and vertical coordinates corresponding to the edge components comprises:
  moving the input coordinate points vertically in proportion with the magnitude of the value of the vertical edge component, and
  moving the input coordinate points horizontally in proportion with the magnitude of the value of the horizontal edge component.

2. The method as claimed in claim 1, wherein the unit of the predetermined size is a unit of a pixel.

3. The method as claimed in claim 1, wherein the identifying of the edge components comprises filtering vertical and horizontal edge components for the background image.

4. The method as claimed in claim 3, further comprising:
determining an intensity of the edge components; and
outputting at least one of a voice and a vibration according to a magnitude of the intensity of the edge components.

5. The method as claimed in claim 3, wherein the moving of the input coordinate points to the horizontal and vertical coordinates corresponding to the edge components comprises moving the input coordinate points so as to correspond to a filtered value of the vertical and horizontal edge components.

6. The method as claimed in claim 1, wherein the identifying of the edge components comprises filtering a diagonal edge component for the background image.

7. The method as claimed in claim 1, further comprising:
determining an intensity of the edge components; and
outputting at least one of a voice and a vibration according to a magnitude of the intensity of the edge components.

8. An electronic device comprising:
a display unit;
a touch input interface unit;
at least one controller; and
a memory unit configured to store at least an image processing program,
wherein the image processing program is executed by the controller, and comprises instructions which when executed by the controller, further configure the controller to:
  identify edge components of a background image by a unit of a predetermined size,
  identify input coordinate points of a touch input which is input on the touch input interface unit,
  determine distorted coordinate points by applying the edge components to the input coordinate points, and
  provide a drawing image formed by connecting the distorted coordinate points on the background image,
wherein the instructions when executed by the controller, further configure the controller to move the input coordinate points to horizontal and vertical coordinates corresponding to the edge components, by calculating the horizontal and vertical coordinates for the input coordinate points, and
wherein the instructions when executed by the controller, further configure the controller to:
  detect a value of the vertical edge component and a value of the horizontal edge component by a predetermined unit,
  move the input coordinate points vertically in proportion with the magnitude of the value of the vertical edge component, and
  move the input coordinate points horizontally in proportion with the magnitude of the value of the horizontal edge component.

9. A non-transitory computer-readable storage medium for storing at least one program, wherein the at least one program comprises instructions which when executed by a controller, configure the controller to:
  identify edge components of a background image by a unit of a predetermined size,
  identify input coordinate points of a touch input which is input on the touch input interface unit,
  determine distorted coordinate points by applying the edge components to the input coordinate points, and
  provide a drawing image formed by connecting the distorted coordinate points on the background image,
wherein the instructions when executed by the controller, further configure the controller to move the input coordinate points to horizontal and vertical coordinates corresponding to the edge components, by calculating the horizontal and vertical coordinates for the input coordinate points, and
wherein the instructions when executed by the controller, further configure the controller to:
  detect a value of the vertical edge component and a value of the horizontal edge component by a predetermined unit,
  move the input coordinate points vertically in proportion with the magnitude of the value of the vertical edge component, and
  move the input coordinate points horizontally in proportion with the magnitude of the value of the horizontal edge component.

* * * * *